United States Patent [19]
Osinsky et al.

[11] 3,836,110
[45] Sept. 17, 1974

[54] MOULDING TOOL FOR THE MANUFACTURE OF COMPONENTS OF SYNTHETIC PLASTIC MATERIAL

[75] Inventors: Ulrich Osinsky, Koenigswinter-Oberpleis; Ferdinand Althausen, Neukirchen, Seelscheid, both of Germany

[73] Assignee: Maschinenfabrick Hennecke GmbH, Leverkusen, Germany

[22] Filed: Mar. 9, 1972

[21] Appl. No.: 233,152

[30] Foreign Application Priority Data
Mar. 24, 1971 Germany.......................... 2114307

[52] U.S. Cl.................. 249/79, 249/111, 425/173, 425/817
[51] Int. Cl. ......................... B29c 1/00, B29d 27/04
[58] Field of Search ................. 249/79, 80, 111, 81; 425/173, 817

[56] References Cited
UNITED STATES PATENTS

| | | | |
|---|---|---|---|
| 1,556,642 | 10/1925 | Smith | 249/79 X |
| 1,717,643 | 6/1929 | Williams | 249/79 |
| 1,854,498 | 4/1932 | Anderson | 425/405 |
| 2,627,628 | 2/1953 | Pare | 249/80 |
| 3,097,398 | 7/1963 | Inglesby | 249/79 X |
| 3,555,597 | 1/1972 | Meadows | 425/173 X |
| 3,664,788 | 5/1972 | Greenberg | 425/173 X |

Primary Examiner—J. Spencer Overholser
Assistant Examiner—David S. Safran
Attorney, Agent, or Firm—Burgess, Dinklage & Sprung

[57] ABSTRACT

For the production of moulded articles of synthetic plastics which undergo thermal change during the moulding, a mould is used with a mould cavity and a chamber containing a quantity of a material whose physical state is adapted to change in adaption of the thermal change.

8 Claims, 2 Drawing Figures

MOULDING TOOL FOR THE MANUFACTURE OF COMPONENTS OF SYNTHETIC PLASTIC MATERIAL

The present invention relates to a moulding tool for the production of moulded articles of synthetic plastics' material, a thermal reaction taking place during or shortly after the filling operation.

In the manufacture of synthetic plastics' articles by casting, injection or mould-foaming, it is usually necessary for the moulding tools being used to have a certain temperature when the moulding composition is introduced and for them to maintain this temperature as exactly as possible until the release from the mould. This applies particularly in the production of moulded articles by the so-called reaction casting method, in which a thermal chemical reaction takes place in the moulding tool, such a reaction, without special measures, would lead to an occasional change in the temperature of the moulding tool.

To keep the temperature constant, the moulding tools have been equipped with passages or chambers, through which is conducted a liquid heat carrier, as for example water or heat-conducting oil.

When the heat of reaction is reached, some of the excess heat is discharged from the moulding tool by means of the heat carrier, in order to prevent an undesired rise in temperature. In similar manner, by means of the same heat carrier, a cooling of the mould is prevented in the time intervals between the chemical reactions by heat being carried to the moulding tool.

In such a method in order to convey heat alternately towards and away from the moulding tool, the heat carrier is pumped outside the moulding tool through a regulating appliance in which it is heated or cooled as required, so as to maintain as accurately as possible the desired nominal temperature in the heat carrier and thus in the moulding tool.

Though this method works well, it has the disadvantage that at least two flexible pipes for the circulation of the heat-carrier medium are necessary between the moulding tool and the instrument for regulating the heat-carrier temperature. This disadvantage is of particular consequence in the mass production of moulded articles, in which for technical reasons a large number of moulding tools usually have to be transported by means of an appropriate revolving conveyor system. This introduces sealing problems, because the supply and discharge lines to the conveyor system must be by way of sliding connections.

It is the object of the present invention to provide a moulding tool for which flexible pipes and a regulating instrument are unnecessary.

According to the present invention, there is provided a moulding tool for the production of synthetic plastics articles, a thermal reaction taking place during or shortly after the filling operation, comprising a mould cavity surrounded by chambers in which is contained a quantity of a material whose physical state is adapted to change in adaptation to the thermal reaction. The latent heat required to change the physical state of the material contained in the chambers on the heat provided by such a change provides for the required heat transfer to the inside of the mould.

For exothermic reactions, the change in the physical state of the material in accordance with the present invention requires a latent heat which corresponds to the quantity of heat being liberated during the reaction. The result obtained is that, during an exothermic reaction the temperature of the moulding tool cannot rise above the melting point or melting range or vaporisation point of the material being used, since the heat resulting from the chemical reaction is used to change the physical state of the material so that this heat quantity is not available to raise the temperature of the moulding tool.

When an endothermic reaction is occurring in the moulding tool, the invention provides for the material whose physical state is to change to be present initially in the state of greater energy, its latent heat of transformation to a lower energy state corresponding to at least part of the heat consumed during the endothermic reaction. The effect is that, when the endothermic process is taking place in the moulding tool, the temperature of the latter is kept for a certain time at the solidification point or in the solidification range or at the condensation point of the material whose state is changing so that the quantity of heat required for the endothermic process in the molding tool is obtained from the latent heat of this material as it changes its physical state. Thus this requirement for a quantity of heat cannot initially lead to a reduction in the temperature of the moulding tool.

According to another embodiment of the moulding tool according to the invention, certain quantities of two different materials A and B whose physical state is to change are contained separately from one another in separate chambers, so that with an exothermic reaction, the latent heat of transformation of the material A provides an upper temperature limit and in the following natural cooling, the latent heat of transformation of the material B provides a lower temperature limit.

As a consequence, the only outside influence needed on the moulding tool is to supply sufficient heat after a cycle is completed so that the material B once again changes into the physical state having the greater energy, but the material A does not.

With the use in accordance with the invention of the change in state from the solid state to the liquid state and back again, a liquid of lower weight by volume and having a deoxidizing action on the meltable material is preferably contained in the chambers, in addition to the respective meltable material. The purpose of this is to counteract any oxidation of the meltable material and in addition to improve the heat flow between the moulding tool and the solidified meltable material, so that the gaps forming because of shrinkage of the meltable material on solidification are filled with this liquid. The heat transfer is thereby substantially improved.

The chambers are advantageously provided with inspection windows. This has the advantage that the change in physical state of the material in the chambers can be observed and consequently the control of the heating and cooling means which are situated outside the moulding tools can be better handled.

The moulding tool according to the invention is suitable for the production of moulded synthetic plastic articles from a wide variety of chemical starting materials, the shaping process taking place endothermally or exothermally, such as materials based on polyurethanes, epoxide resins, polyester resins and silicon rubbers.

Examples of suitable meltable materials for filling the chambers are elementary metals and also two-component or multi-component alloys of the elements bismuth, tin, lead, cadmium, indium, antimony and zinc, whose melting point can be adapted to a relatively wide range to actual requirements, or organic and inorganic chemical compounds. For polyurethane foaming moulds, paraffin with a melting point of 54°C and a heat of fusin of 35.1 kcal./kg, is particularly suitable.

Hydrocarbon compounds are, for example, suitable as vaporisable materials for filling the chambers.

A moulding tool according to the invention is shown in strictly diagrammatic form in the accompanying drawing, wherein.

Figure 1:
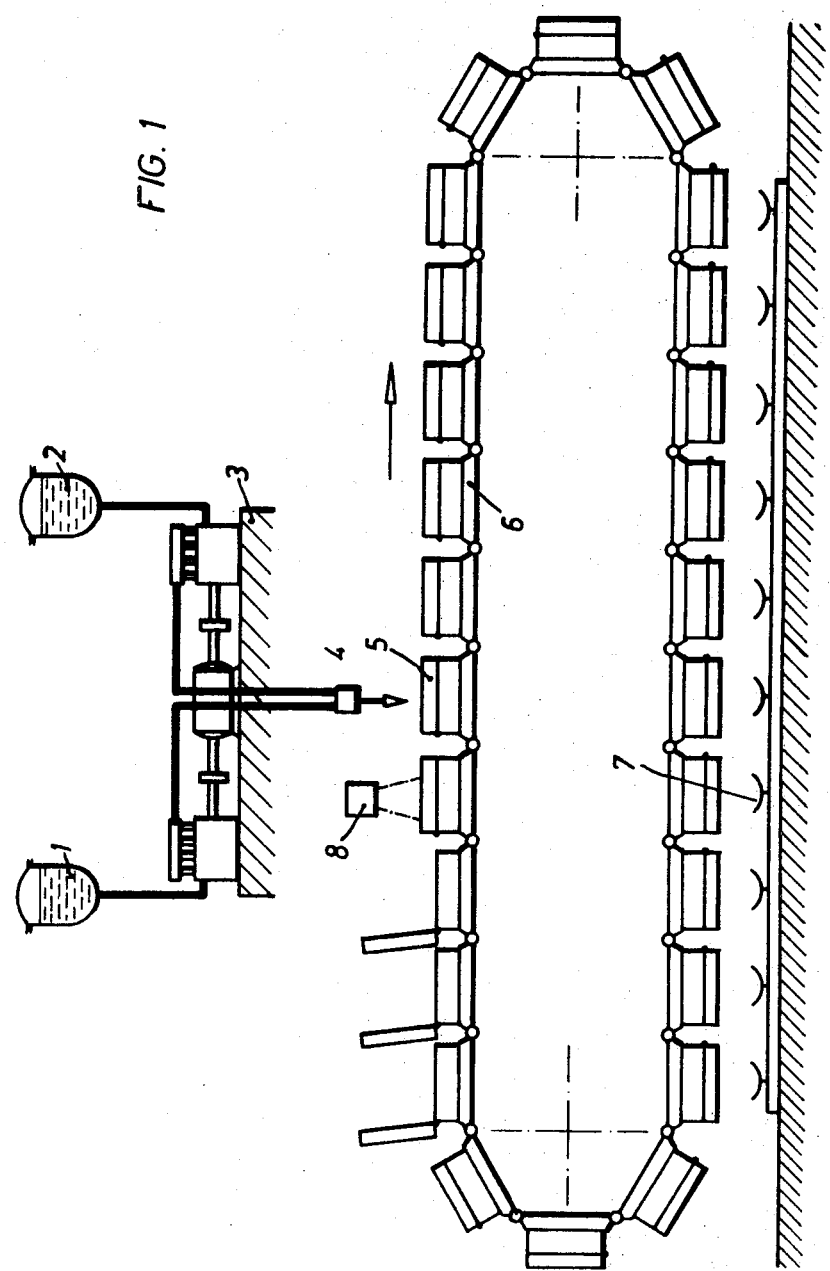
FIG. 1 shows a belt installation for the manufacture of moulded components.

In FIG. 1, an isocyanate component and a polyol component pass from the containers 1 and 2 respectively into a metering assembly 3 which supplies these materials to a mixing head 4. From this mixing head 4, the mixture is introduced into moulding tools 5, which are arranged on a conveyor belt 6. The moulding tools 5 are preheated by a heating means 7 to a certain temperature before they are filled. The temperature of the moudling tools 5 is checked by a temperature-sensing device 8.

Figure 2:
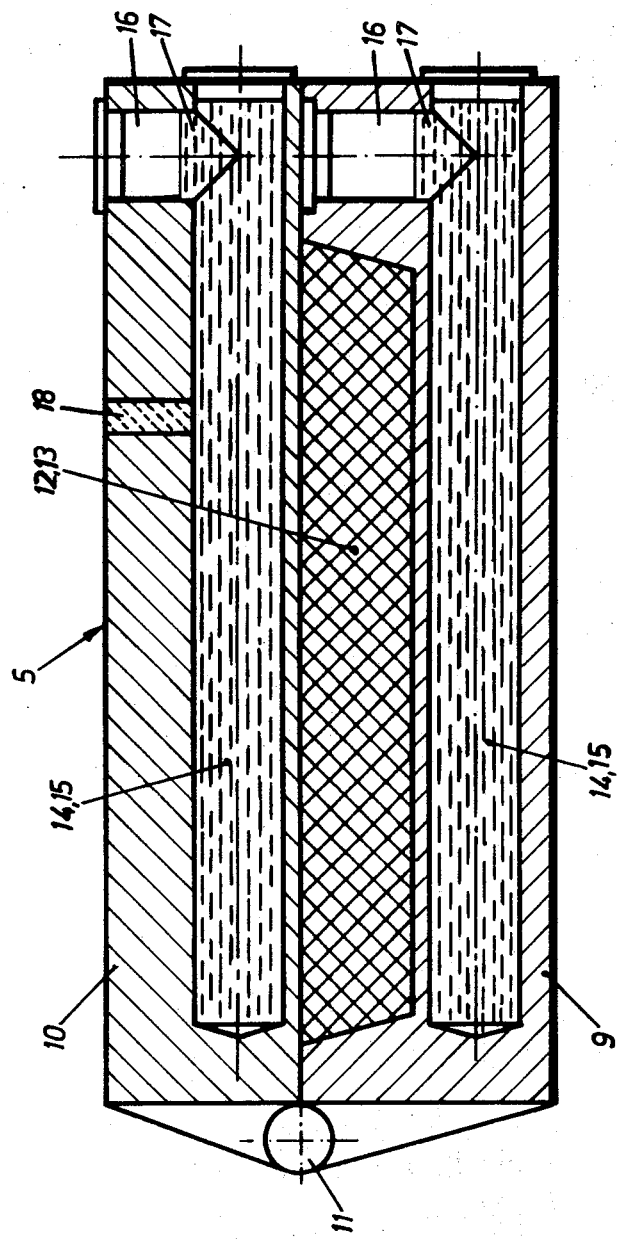
FIG. 2 is a vertical section through a moulding tool.

FIG. 2 shows one of the moulding tools 5 on an enlarged scale. The tool comprises a bottom box 9 and a top box 10, connected together by a hinge 11. The mould cavity 12 is already filled with a fully foamed moulded element 13. Arranged in the bottom box 9 and the top box 10 are chambers 14, in which is disposed, as meltable material 15, a Wood's alloy which has a melting point of 65°C and a heat of fusion of about 7.8 kcal/kg. The optimum mould temperature for the chosen mixture for the production of the synthetic plastic component is likewise 65°C. Disposed in inlet bores 16 is a liquid 17, which provides for a better heat transfer between the moulding tool 5 and the meltable material 15 if cracks in the material 15 occur during solidification, these cracks being then filled by liquid 17. An inspection window 18 is arranged in the top box 10 of the mould.

The installation shown in FIG. 1 and FIG. 2 operates as follows:

First of all, the moulding tools 5 are circulated by means of the belt 6 and heated by the heating means 7 until the temperature-sensing device 8 indicates a temperature of about 63°C, so that now, by manual adjustment or automatic control, the heating output of the heating means 7 can be switched back to covering the heat losses of the moulding tools. When this state is reached, the moulding tools 5 are filled with reaction mixture from the mixing head 4 in the conveying cycle of the belt 6. The chemical reaction commencing after the so-called starting time in each moulding tool 5 now supplies a heat quantity which initially heats the mold cavity 12 proper to above the previously set 63°C, so as eventually to melt the Wood's metal 15 which is in the immediate vicinity of the chambers 14. The heat required for this purpose as latent heat of fusion leads by way of the effect of the holding point in the melting curve of the metal 15 to the temperature stabilisation which is used according to the invention, so that by using the correct quantities a maximum temperature of about 65°C is maintained for the moulding tools 5 considered in the example.

In the so-called curing phase, i.e., after the exothermic reaction has subsided, the heat being steadily given off by the moulding tool 5 through its surface leads to the gradual solidification of the Wood's metal 15, until finally there is once again a departure from the temperature-holding point. With ventilation of the moulding tool surfaces and by measured heating by the heating means 7, the process is so influenced that the approaching moulding tools 5 again have the temperature of about 63°C, which is desirable for this position.

Calculated guide for one example:

Given:
| | | |
|---|---|---|
| Quantity of reaction mixture | $G_R$ | = 175 g |
| specific heat of reaction | $q_R$ | = 50 cal/g |
| construction weight of the light metal moulding tool | $G_{Al}$ | = 6500 g |
| specific heat of the light melt alloy | $c_{Al}$ | = 0.215 cal/g degrees |
| melting point of the bismuth alloy | $\theta_{mp}$ | = 65°C |
| fusion heat of the bismuth alloy | $\theta_{mp}$ | = 7.8 cal/g |
| specific gravity of the bismuth alloy (solid) | $\gamma$ | = 9.7 g/cc |
| lower temperature of the moulding tool permitted by calculation | $\theta 1$ | = 63°C |
| upper temperature of the moulding tool permitted by calculation | $\theta 2$ | = 65°C |

Investigated:

What quantity of the bismuth alloy must be deposited in the moulding tool to produce the stabilisation at 65°C ?

Calculation:

Heat of reaction $Q_R = G_R \cdot q_r = 175 \cdot 50 = 8.750$ cal

The heat quantity necessary for heating the light metal construction $Q_{Al} = G_{Al} \cdot c_{Al} \cdot (\theta_2 - \theta_1) = 6,500 \cdot 0.215 \cdot (65-63)$
$= 2,800$ cal The heat quantity to be transformed in the limiting case into melting heat $Q_{Sch} = Q_R - Q_{Al} = 8,750 - 2,800 = 5,950$ cal The necessary quantity of bismuth alloy $(Q_{Sch} = 5950 = 763$ g $G_{Sch}\ q_{Sch})\ 7.8$ The volume to be deposited:

$(G_{Sch} = 763 = 78.8$ cc $V_{Sch}\ \gamma_{Sch})\ 9.7$

In order to improve the temperature-stabilising effect, the quantity to be deposited in practice is chosen to be larger than that which is necessary for the limiting case on the basis of the present calculation. The present mould is made in practice with $V_{Sch} = 100$ cc. This volume may for example distributed to four cylindrical chambers with a diameter of 1.6 cm and a length of 12.5 cm.

The chambers are constructed in the moulding tool in such a way as to produce as small a spacing as possible between the mould cavity and the meltable substance in the chambers, so that in practice the temperature drop from the mould cavity to the chambers is as small as possible.

What we claim is:

1. A mould for the production of articles wherein the production involves a thermal action during or shortly after the filling operation, comprising a body portion having a mould cavity for moulding of the article, a chamber within the body portion, and a material within the chamber for changing of the physical state thereof in dependence on the thermal action, said mould including a plurality of said chambers, at least one chamber containing a first material for changing physical state at a first temperature, at least one chamber containing a second material for changing physical state at a second temperature, said first temperature being higher than said second temperature, for limiting of temperature rise during exothermic condition in the mould cavity and limiting temperature drop during endothermic condition in the mould cavity.

2. A moulding tool according to claim 1, the change of physical state of the first and second materials being between liquid and solid.

3. A moulding tool according to claim 2, an auxiliary material present in each of said chambers, each auxiliary material being a liquid of lower specific gravity than the other material accompanying it when the other material is in the liquid state and having a deoxidizing action on the other material.

4. A moulding tool according to claim 1, said mould including an inspection window for each chamber.

5. A mould for the production of articles wherein the production involves a thermal action during or shortly after the filling operation, comprising a body portion having a mould cavity for moulding of the article, a chamber within the body portion, and a material within the chamber for changing of the physical state thereof in dependence on the thermal action, the change of state being between liquid and solid, and an auxiliary material present in said chamber, said auxiliary material being a liquid of lower specific gravity than the first mentioned material in the liquid state and having a deoxidizing action on the first mentioned material.

6. A moulding tool according to claim 5, said mould including an inspection window for each chamber.

7. A moulding tool according to claim 5, said first mentioned material being paraffin.

8. A moulding tool according to claim 5, said first mentioned material being Wood's metal.

* * * * *